US 7,167,911 B2

(12) United States Patent
Heise

(10) Patent No.: US 7,167,911 B2
(45) Date of Patent: Jan. 23, 2007

(54) DEACTIVATION OF TRANSCEIVERS TO A STANDBY STATE WITH A HOT START CAPABILITY

(75) Inventor: Bernd Heise, Munich (DE)

(73) Assignee: Infineon Technologies AG, Munich ( * ) Notice: Subject to any disclaimer, the term of this patent is extended or adjusted under 35 U.S.C. 154(b) by 656 days.

(21) Appl. No.: 10/212,665

(22) Filed: Aug. 5, 2002

(65) Prior Publication Data

US 2003/0063658 A1    Apr. 3, 2003

(30) Foreign Application Priority Data

Aug. 3, 2001    (DE)  ............................ 101 39 777

(51) Int. Cl.
  *G06F 15/173*    (2006.01)
  *G06F 15/16*    (2006.01)
  *H04B 1/38*    (2006.01)
(52) U.S. Cl. ...................... 709/223; 709/227; 375/219
(58) Field of Classification Search ................ 709/227, 709/228, 223, 224, 230, 232, 249; 375/219
See application file for complete search history.

(56) References Cited

U.S. PATENT DOCUMENTS

| | | | | |
|---|---|---|---|---|
| 4,754,273 | A | 6/1988 | Okada et al. | 340/825 |
| 5,852,630 | A * | 12/1998 | Langberg et al. | 375/219 |
| 6,252,901 | B1 | 6/2001 | Mueller et al. | 375/222 |
| 6,445,730 | B1 * | 9/2002 | Greszczuk et al. | 375/219 |

FOREIGN PATENT DOCUMENTS

EP    0991223    4/2000

OTHER PUBLICATIONS

"Transmission and Multiplexing (TM); Integrated Services Digital Netwrok (ISDN) basic rate access; Digital transmission system on metallic local lines," ETSI TS 102 080, V1.3.2, pp. 1-112, (May 2000).
ITU-T Standard G992.2, "Splitterless asymmetric digital subscriber line (ADSL) transceivers" Jun. 1999, S. 84-99.
ETSI Standard TS 101524 V1.1.1., "Transmission and Multiplexing TM; Access transmission system on metallic access cables; Symmetrical single pair high bitrate Digital Subscriber Line (SDSL)". Sophia Antipolis. Jun. 2001, S. 10-15 and S. 28-33.
ETSI Standard ETS 300 297., "Integrated Services Digital Network (ISDN); Access digital section for ISDN basic access." Sophia Antipolis, May 1995. S. 16-25.
ETSI Standard ETS 300 012-1., "Integrated Services Digital Network (ISDN); Basic User Network Interface (UNI); Part 1: Layer 1 Specification" Sophia Antipolis, Oct. 1998, S. 12-14, S. 21-31.

* cited by examiner

*Primary Examiner*—Andrew Caldwell
*Assistant Examiner*—Alan Chou
(74) *Attorney, Agent, or Firm*—Fish & Richardson P.C.

(57) ABSTRACT

In a data transmission a system controller generates a deactivation signal when a data stream between a subscriber transceiver and an exchange transceiver has no payload in either direction. Exchange-end transmission coefficients are then stored by an exchange memory. The deactivation signal is transmitted back to the subscriber-end transceiver, which then stores subscriber-end coefficients in a subscriber memory. The subscriber transceiver then sends the deactivation signal back to the exchange transceiver, which then stops data transmission. In response to detecting the stopping of data transmission, the subscriber-end transceiver likewise stops data transmission. Both transceivers are then placed in a stand-by state.

10 Claims, 1 Drawing Sheet

DEACTIVATION OF TRANSCEIVERS TO A STANDBY STATE WITH A HOT START CAPABILITY

FIELD OF INVENTION

The invention relates in general to deactivation of exchange-end and subscriber-end transmitting/receiving devices.

RELATED APPLICATIONS

The application claims the benefit of the Aug. 3, 2001 priority date of German application 101 39 777.1, the contents of which are herein incorporated by reference.

BACKGROUND

Many data transmission methods which are important in practice have no capability to deactivate a transmission mode in order to switch a transmitting/receiving device to an energy saving mode, in an advantageous manner, and on the other hand to, provide an effective and rapid hot start.

xDSL technologies relate to various types of use/carrier methods for lines to which packet-oriented or row-oriented protocols can be applied. By way of example, DSL (digital subscriber line=digital interface line), ADSL (asymmetrical DSL), SDSL (single line DSL), HDSL (high data rate DSL) and a combination of the last two transmission methods, S(H)DSL are used on conventional telephone lines from an exchange-end transmitting/receiving device to a subscriber-end transmitting/receiving device.

Until now, transmission methods such as these have had the disadvantage that no hot start capability is provided.

Methods according to the prior art provide hot start capabilities for ISDN (integrated services digital network), as described by way of example, at the exchange end, for a data transmission rate of 144 kbps in "ETSI TS 102 080, Integrated Services Digital Network (ISDN) basic rate access, Third Edition, November 1998" and the Publication "ANSI TI,601-1988, Integrated Services Digital Network (ISDN), ANSI, September 1988".

Until now, particularly for S(H)DSL transmission methods, there has been no capability to carry out a hot start after deactivation of a data transmission path, as described, by way of example, in "ITU-T G.991.2, Single-pair high-speed digital subscriber line (SHDSL) transceivers", "ETSI TS 101 524 Symmetric single pair high bit rate digital subscriber line (SDSL)".

One disadvantage of the "Deactivation Text Proposal" in the literature reference "Adtran, Deactivation Text Proposal, ETSI-Meeting, TM6, Helsinki, May 2000, 002t35a0" is that it is impossible to cancel any deactivation, and the deactivation process takes place only after a fixed time has elapsed.

Conventional methods and apparatuses for transmission of data streams which are to be transmitted thus require lengthy cold starts, that is to say activation and adaptation of exchange-end transceivers and subscriber-end transceivers to line characteristics of a data transmission path.

A matching process such as this has the disadvantage that it typically requires a time period of 30 seconds or more. If hot starts were possible, a deactivated line or a deactivated data transmission path could be activated in a fraction of the abovementioned time period (in a time period of approximately 500 milliseconds), based on the knowledge of the line characteristics, which would result in a considerable advantage for the setting up of a data transmission line.

Methods and apparatuses according to the prior art disadvantageously consume power, in particular in the exchange-end transmitting/receiving devices and in the subscriber-end transmitting/receiving devices, even when the at least one data stream which is to be transmitted does not contain any payload data.

SUMMARY

One object of the present invention is thus to provide a method for transmission of data streams which are to be transmitted, in which at least one transmitting/receiving device at an exchange end and/or at a subscriber end can be deactivated to a standby state, so that a subsequent activation process can be carried out as a "hot start".

One major idea of the invention is that at least one exchange-end transmitting/receiving device and/or at least one subscriber-end transmitting/receiving device can be switched to an energy saving mode which allows a subsequent hot start, such that a deactivation method is deactivated to a standby state which, inter alia, has the following features:

(i) determination of an initiator (exchange-end transmitting/receiving device, subscriber-end transmitting/receiving device, etc.) for deactivation;

(ii) transmission of information to a corresponding opposing end that deactivation is being carried out;

(iii) ensuring that both ends, that is to say the exchange end and the subscriber end, respectively store switching-end transmission coefficients for the at least one data transmission path or subscriber-end transmission coefficients for the at least one data transmission path, as are relevant for a data transmission which is to be carried out after a hot start, in at least one exchange-end coefficient memory unit, or at least one subscriber-end coefficient memory unit, respectively; and (iv) definition of times at which the respective exchange end and/or subscriber end end/ends a transmission of data streams which are to be transmitted.

One advantage of the present invention is thus that it allows activation in a simple manner of exchange-end transmitting/receiving devices and/or subscriber-end transmitting/receiving devices which have been deactivated to a standby state.

The method according to the invention for transmission of data streams which are to be transmitted essentially has the following steps:

a) provision of a deactivation signal by means of a system control device when the at least one data stream which is to be transmitted does not contain any payload data in either of the two data stream directions;

b) storage of exchange-end transmission coefficients for at least one data transmission path in an exchange-end coefficient memory unit in the exchange-end transmitting/receiving device;

c) transmission of the deactivation signal via the at least one data transmission path from the exchange-end transmitting/receiving device to the subscriber-end transmitting/receiving device;

d) storage of subscriber-end transmission coefficients for the at least one data transmission path in a subscriber-end coefficient memory unit in the subscriber-end transmitting/receiving device;

e) transmission of the deactivation signal back via the at least one data transmission path from the subscriber-end transmitting/receiving device to the exchange-end transmitting/receiving device;

f) stopping of a transmission of data streams, which are to be transmitted via the at least one data transmission path, at the exchange end; and g) identification of the stopping of a transmission of data streams, which are to be transmitted via the at least one data transmission path, at the exchange end, and stopping of a transmission at the subscriber end; and h) deactivation of the subscriber-end transmitting/receiving device and/or of the exchange-end transmitting/receiving device to a standby state in each case.

According to one preferred development of the present invention, the exchange-end transmitting/receiving device can cancel the deactivation signal which has been provided, during transmission of the at least one data stream which is to be transmitted, in order to prevent deactivation of both the exchange-end transmitting/receiving device and of the subscriber-end transmitting/receiving device.

It is thus advantageously possible to use parameters which have been determined for the at least one data transmission path in order to continue a data transmission.

According to a further preferred development of the present invention, the subscriber-end transmitting/receiving device can cancel the deactivation signal which has been provided, during transmission of the at least one data stream which is to be transmitted, in order to prevent deactivation of both the exchange-end transmitting/receiving device and of the subscriber-end transmitting/receiving device.

It is advantageous to be able to carry out a subscriber-end deactivation process, since parameters for the at least one data transmission path are still known for the further transmission of data which is to be transmitted.

For as long as a transmission of data streams which are to be transmitted continues, the exchange-end transmitting/receiving device can advantageously cancel a deactivation signal by once again transmitting a message via a first operational channel with an EOC (embedded operational channel) message with the identification ID21 preferably being chosen, and with a specific bit, which has not previously been set in the message, being set in a further byte.

In the opposite sense, one advantage is that the subscriber-end transmitting/receiving device can prevent deactivation of transmitted data streams during transmission of data streams, which are to be transmitted, in a second operational channel in that a message is set, that is to say a bit ID148, which is not set in a conventional deactivation signal.

According to yet another preferred development of the present invention, both the exchange-end transmitting/receiving device and the subscriber-end transmitting/receiving device can use the first operational channel and the second operational channel to preset parameters for the standby state and/or for a subsequent hot start.

According to yet another preferred development of the present invention, a standby state can be interrupted by the exchange-end transmitting/receiving device and/or by the subscriber-end transmitting/receiving device in order to check characteristics of the at least one data transmission path.

It is thus possible to determine, in an advantageous manner, whether the line characteristics have changed, in which case, if the line characteristics have changed, exchange-end transmission coefficients in the exchange-end coefficient memory unit can be adapted, and/or subscriber-end transmission coefficients in the subscriber-end coefficient memory unit can be adapted.

According to yet another preferred development of the present invention, signals are requested by the exchange-end transmitting/receiving device and/or by the subscriber-end transmitting/receiving device by means of which an echo elimination device and/or an equalization device are/is matched to characteristics of the at least one data transmission path.

This advantageously allows at least one echo elimination device and/or at least one equalization device to be "trained" separately for a hot start, if the line characteristics of the at least one data transmission path have changed.

It is also expedient that the nature and time duration of these signals can be specified by means of messages via the first operational channel and the second operational channel.

According to yet another preferred development of the present invention, a subscriber-end transmission stop is produced by means of a first synchronization error signal and/or by means of a failure of a signal level on the data transmission path, so that this then results in a subscriber-end standby state.

According to yet another preferred development of the present invention, an exchange-end standby state is produced by means of a second synchronization error signal, and/or directly via an exchange-end transmission stop.

The apparatus according to the invention for transmission of data streams which are to be transmitted, in which at least one transmitting/receiving device can be activated to a standby state, also has:

a) an exchange-end transmitting/receiving device;

b) at least one data transmission path, which has a first operational channel and a second operational channel;

c) a subscriber-end transmitting/receiving device;

d) a system control device, which produces a deactivation signal when the data stream which is to be transmitted does not contain any payload data;

e) an exchange-end coefficient memory unit for storage of exchange-end transmission coefficients for the at least one data transmission path in the exchange-end transmitting/receiving device; and f) a subscriber-end coefficient memory unit for storage of subscriber-end transmission coefficients for the at least one transmission path in the subscriber-end transmitting/receiving device.

An exemplary embodiment of the invention is illustrated in the drawing and will be explained in more detail in the following description.

DETAILED DESCRIPTION

Figure 1:
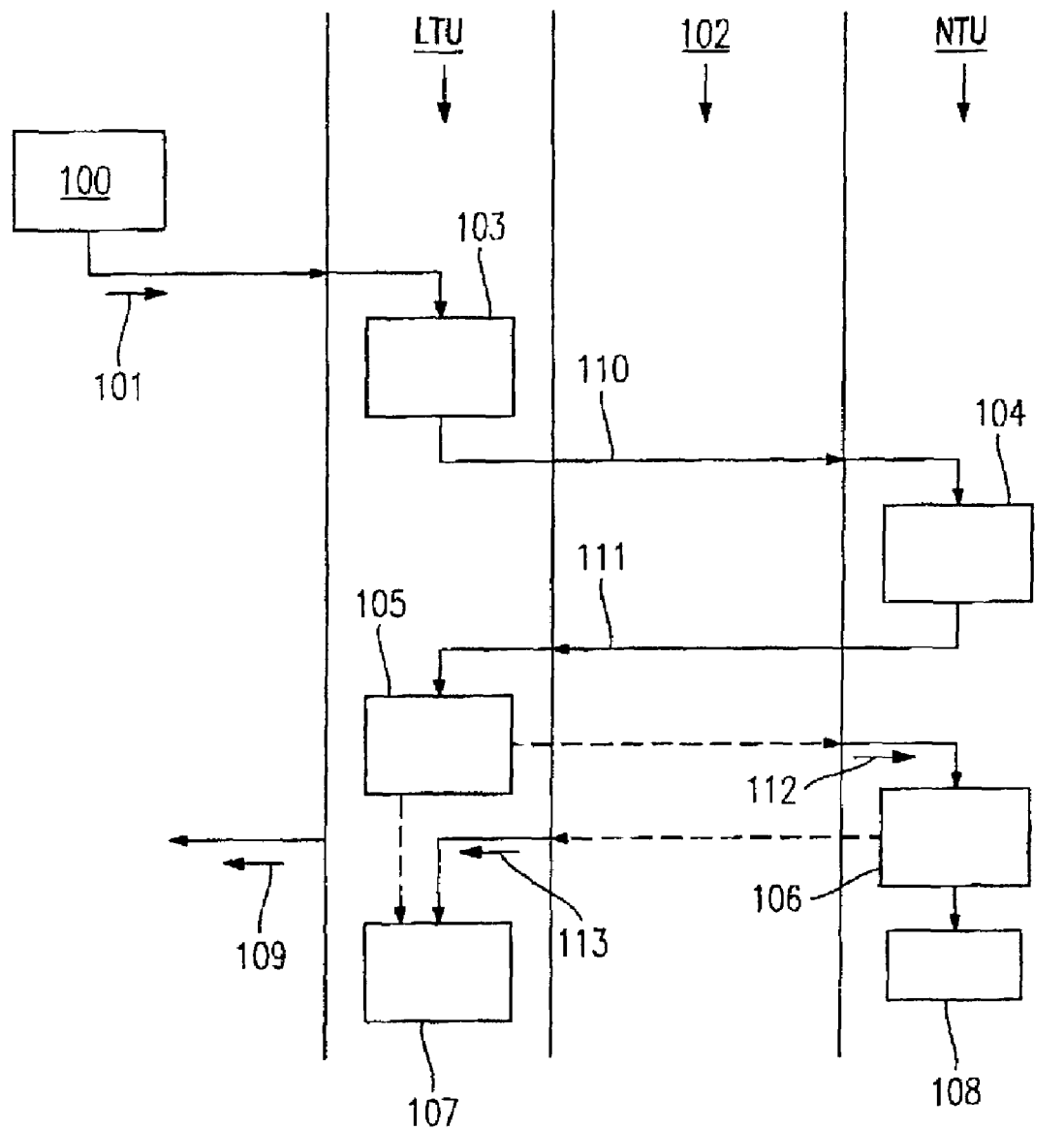
FIG. 1 shows a block diagram of a method for transmission of data streams which are to be transmitted, in which at least one transmitting/receiving device can be deactivated to a standby state, according to one exemplary embodiment of the present invention.

In the block diagram according to one exemplary embodiment of the present invention as illustrated in FIG. 1, an exchange-end transmitting/receiving device LTU (on the left) and a subscriber-end transmitting/receiving device NTU (on the right) are shown, which are connected by means of a data transmission path 102.

The data transmission path is formed from a first operational channel 110 for transmission of data streams which are to be transmitted from the exchange-end transmitting/receiving device LTU to the subscriber-end transmitting/receiving device NTU, and a second operational channel 111 for transmission of data which is to be transmitted from the subscriber-end transmitting/receiving device NTU to the exchange-end transmitting/receiving device LTU.

If software which is contained in a system control device 100 finds that the transmitted data stream does not contain any payload data, the system control device 100 emits a deactivation signal 101. This system control signal 101 is supplied to an exchange-end coefficient memory unit 103, which stores all the exchange-end transmission coefficients for the at least one data transmission path which are relevant for transmission of data which is to be transmitted, thus ensuring that a subsequent hot start is carried out using the relevant transmission coefficients.

The exchange-end transmitting/receiving device LTU then transmits a message, which is provided by way of example with an identification ID21, via the first operational channel 110. The messages which are transmitted via the first and second operational channels 110 and 111, respectively, for deactivation of the exchange-end transmitting/receiving device LTU and of the subscriber-end transmitting/receiving device NTU, respectively, are constructed as follows.

| 1st Byte | Message ID21 or ID149 | | | | | | | |
|---|---|---|---|---|---|---|---|---|
| 2nd Byte | NoD | EC | LP | KAS | 0 | 0 | 0 | 0 |

NoD = "1": Deactivation not possible (NTU) or is cancelled (LTU)
NoD = "0": Deactivation is requested (LTU) or confirmed (NTU)
EC = "1": Time required for echo cancellation for hot start
LP = "1": Signal for "line probing" is requested
KAS = "1": "Keep alive signals" requested during power down
EC, LP, KAS = "0": Segments are omitted.

It should be mentioned that any other identification IDxx may also be used instead of a message with an identification ID21, provided that this identification has not been used previously.

Once the subscriber-end transmitting/receiving device NTU has received the message, that is to say the deactivation signal 101, which is transmitted via the first operational channel 110, in the same way as explained above with reference to the exchange-end transmitting/receiving device LTU, subscriber-end transmission coefficients are stored in a subscriber-end coefficient memory unit 104 in the subscriber-end transmitting/receiving device NTU.

Reception of the deactivation signal 101 and storage of the subscriber-end transmission coefficients in the subscriber-end coefficient memory unit 104 are confirmed by a message from the subscriber-end transmitting/receiving device NTU to the exchange-end transmitting/receiving device LTU via a second operational channel 111, with the message having, by way of example, an identification ID149, which is explained in the table above.

It should be mentioned that any other identification can be used instead of an identification ID149, provided that this identification represents an ID which has not already been used.

On receiving the ID149 message via the second operational channel 111, the exchange-end transmitting/receiving device LTU stops transmitting data streams, as is shown by a block 105 in FIG. 1.

The subscriber-end transmitting/receiving device NTU now identifies the failure of a "far end" signal (signal from the remote end) by synchronization being lost, that is to say a first synchronization error signal 112 is provided for the subscriber-end transmitting/receiving device NTU, in response to which a subscriber-end transmission stop is produced, as is shown by a block 106 in the block diagram in FIG. 1.

The subscriber-end transmitting/receiving device then changes to an energy saving mode, that is to say to a subscriber-end transmitting/receiving device standby state, as is shown by a block 108 in the block diagram in FIG. 1.

The exchange-end transmitting/receiving device identifies a failure of a "far end" signal (signal from the remote end, that is to say now from the subscriber-end transmitting/receiving device) in a similar manner by loss of synchronization, that is to say the exchange-end transmitting/receiving device LTU is provided with a second synchronization error signal 113, in response to which the exchange-end transmitting/receiving device likewise changes to an energy saving mode, that is to say to an exchange-end standby state, as is shown by a block 107 in the block diagram in FIG. 1.

An exchange-end standby state can also be brought about directly via an exchange-end transmission stop (dashed arrow from the block "105" to the block "107" in FIG. 1).

The exchange-end transmitting/receiving device LTU can also emit a deactivation confirmation signal 109, which can be supplied to the system control unit 100 for confirmation, and/or to further circuit units.

The method according to the invention and the apparatus according to the invention for transmission of data streams which are to be transmitted thus make it possible to deactivate exchange-end transmitting/receiving devices and/or subscriber-end transmitting/receiving devices to a standby state, in an efficient manner, so that a subsequent hot start can be carried out without any lengthy adaptation being required to line characteristics of the at least one transmission path, and with energy saving being provided in an advantageous manner both in the exchange-end transmitting/receiving device and in the subscriber-end transmitting/receiving device.

Although the present invention has been described above with reference to preferred exemplary embodiments, it is not restricted to these exemplary embodiments and can be modified in many ways.

What is claimed is:

1. A method of controlling data transmission between a subscriber-end transceiver and an exchange-end transceiver connected to each other by a data transmission path, the method comprising:

generating a deactivation signal at a system control device when a data stream to be transmitted carries no payload in either of two data stream directions;

in response to the deactivation signal, storing exchange-end transmission coefficients for the data transmission path in an exchange memory of an exchange-end transceiver;

transmitting the deactivation signal on the data transmission path from the exchange-end transceiver to the subscriber-end transceiver;

in response to receiving the deactivation signal, storing subscriber-end transmission coefficients for the data transmission path in a subscriber-end memory unit in the subscriber-end transceiver;

transmitting the deactivation signal back to the exchange-end transceiver from the subscriber-end transceiver on the data transmission path;

in response to receiving the deactivation signal back from the subscriber-end transceiver, stopping data transmission on the data transmission path at the exchange-end transceiver;

in response to detecting the stopping of data transmission at the exchange-end transceiver, stopping data transmission at the subscriber-end transceiver;

placing the exchange-end transceiver and the subscriber-end transceiver in a stand-by state; wherein the exchange-end transceiver and the subscriber-end transceiver are configured to use first and second operational channels to preset parameters for a stand-by state, and to use first and second operational channels to preset parameters for a hot start; and continuously interrupting the stand-by state with a device selected from the group consisting of the exchange-end transceiver and the subscriber-end transceiver to inspect a characteristic of the data transmission path by requesting a signal indicative of the characteristics of the data transmission path; and on the basis of the requested signal, matching an echo elimination device and an equalization device to the characteristics of the data transmission path.

2. The method of claim 1, further comprising configuring the exchange-end transceiver to selectively cancel the deactivation signal during data transmission to prevent deactivation of the exchange-end transceiver and the subscriber-end transceiver.

3. The method of claim 1, further comprising configuring the subscriber-end transceiver to selectively cancel the deactivation signal during data transmission to prevent deactivation of the exchange-end transceiver and the subscriber-end transceiver.

4. The method of claim 1, further comprising generating a sub scriber-end transmission stop in response to detecting a first synchronization error signal.

5. The method of claim 1, further comprising generating a subscriber-end transmission stop in response to detecting a failure of a signal level on the data transmission path.

6. The method of claim 1, further comprising entering an exchange-end stand-by state in response to a second synchronization error signal.

7. The method of claim 1, further comprising entering an exchange-end stand-by state in response to an exchange-end transmission stop.

8. A data-transmission system comprising:

an exchange-end transceiver;

a subscriber-end transceiver;

a data transmission path for communicating a data stream between the exchange-end transceiver and the subscriber-end transceiver;

an exchange-end coefficient memory for storage of exchange-end transmission coefficients associated with the data transmission path;

a subscriber-end coefficient memory for storage of subscriber-end transmission coefficients associated with the data transmission path; and a system controller configured to provide the exchange-end memory unit with a deactivation signal when the data stream contains no payload; wherein the exchange-end coefficient memory and the subscriber-end coefficient memory are configured to use first and second operational channels to preset parameters for a stand-by state, and to use first and second operational channels to preset parameters for a hot start; and a device selected from the group consisting of the exchange-end transceiver and the subscriber-end transceiver configured to continuously interrupt the stand-by state to inspect a characteristic of the data transmission path by requesting a signal indicative of the characteristics of the data transmission path; and on the basis of the requested signal, the device being configured to match an echo elimination device and an equalization device to the characteristics of the data transmission path.

9. The data-transmission system of claim 8, wherein the exchange-end transceiver is configured to selectively cancel the deactivation signal during data transmission to prevent deactivation of the exchange-end transceiver and the subscriber-end transceiver.

10. The data-transmission system of claim 8, wherein the subscriber-end transceiver is configured to selectively cancel the deactivation signal during data transmission to prevent deactivation of the exchange-end transceiver and the subscriber-end transceiver.

* * * * *

UNITED STATES PATENT AND TRADEMARK OFFICE
CERTIFICATE OF CORRECTION

PATENT NO. : 7,167,911 B2 Page 1 of 1
APPLICATION NO. : 10/212665
DATED : January 23, 2007
INVENTOR(S) : Heise It is certified that error appears in the above-identified patent and that said Letters Patent is hereby corrected as shown below:

Title page, item (*) Notice: Delete "656 days" and insert --693 days--.

Signed and Sealed this

Sixteenth Day of October, 2007

JON W. DUDAS
*Director of the United States Patent and Trademark Office*